United States Patent
Cho et al.

(10) Patent No.: US 8,170,324 B2
(45) Date of Patent: May 1, 2012

(54) APPARATUS AND METHOD FOR VISION PROCESSING ON NETWORK BASED INTELLIGENT SERVICE ROBOT SYSTEM AND THE SYSTEM USING THE SAME

(75) Inventors: Jae Il Cho, Daejon (KR); Seung Min Choi, Daejon (KR); Dae Hwan Hwang, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1010 days.

(21) Appl. No.: 12/088,111

(22) PCT Filed: Dec. 15, 2005

(86) PCT No.: PCT/KR2005/004319
§ 371 (c)(1),
(2), (4) Date: Mar. 26, 2008

(87) PCT Pub. No.: WO2007/066842
PCT Pub. Date: Jun. 14, 2007

(65) Prior Publication Data
US 2008/0240547 A1 Oct. 2, 2008

(30) Foreign Application Priority Data
Dec. 7, 2005 (KR) .................. 10-2005-0119019

(51) Int. Cl.
*G06K 9/36* (2006.01)
(52) U.S. Cl. ............................ 382/153; 382/154
(58) Field of Classification Search .................. None
See application file for complete search history.

(56) References Cited

U.S. PATENT DOCUMENTS

| | | | |
|---|---|---|---|
| 7,277,559 B2* | 10/2007 | Matsunaga et al. | 382/103 |
| 2004/0013295 A1* | 1/2004 | Sabe et al. | 382/153 |
| 2004/0193323 A1* | 9/2004 | Higaki et al. | 700/259 |
| 2004/0233290 A1* | 11/2004 | Ohashi et al. | 348/187 |
| 2005/0165508 A1* | 7/2005 | Kanda et al. | 700/245 |

FOREIGN PATENT DOCUMENTS

| | | |
|---|---|---|
| JP | 03-002906 | 1/1991 |
| JP | 2003-006620 | 1/2003 |
| JP | 2003-304528 | 10/2003 |
| JP | 2004-306249 | 4/2004 |
| JP | 2005-250994 | 9/2005 |

OTHER PUBLICATIONS

International Search Report mailed Aug. 28, 2006; PCT/KR2005/004319.

* cited by examiner

*Primary Examiner* — Brian P Werner
(74) *Attorney, Agent, or Firm* — Ladas & Parry LLP

(57) ABSTRACT

There are provided an apparatus and method for vision processing on a network based intelligent service robot system and a system using the same. A robot can move to a target object, avoiding obstacles without helps of a robot server interfaced with a robot terminal over network, by extracting/processing three-dimensional distance information of external objects, using a stereo camera, a low price image processing dedicated chip and an embedded processor. Therefore, the intelligent robot can travel and move using only a stereo camera image processing without other sensors, and further provides users with various functional services with low expense.

8 Claims, 4 Drawing Sheets

(a) OUTPUT IMAGE OF CAMERA (b) OUTPUT IMAGE OF INPUT IMAGE PRE-PROCESSING UNIT (c) OUTPUT IMAGE OF STEREO MATCHING UNIT (d) OUTPUT IMAGE OF IMAGE POST-PROCESSING UNIT

APPARATUS AND METHOD FOR VISION PROCESSING ON NETWORK BASED INTELLIGENT SERVICE ROBOT SYSTEM AND THE SYSTEM USING THE SAME

TECHNICAL FIELD

The present invention relates to a vision processing on a network based intelligent service robot, and more particularly, to a technology that a stereo matching result for an acquired stereo image is used for a robot's traveling and moving in the network based intelligent service robot.

BACKGROUND ART

Most of conventional vision processing apparatuses in a robot system is restrictively used in recognizing an external circumstance of a robot through input information of only one camera. Therefore, there is a disadvantage that it is necessary to compositively use information obtained from other sensors such as a ultrasonic sensor, an infrared sensor, or the like, in order to make use of the conventional vision processing apparatuses for the travel and movement of the robot. In particular, because a necessary vision processing operation is performed in a robot server connected to a robot terminal over network in the network based intelligent service robot, there is also a disadvantage that it causes excessive communication traffics between the robot terminal and the robot server.

FIG. 1 is a block diagram illustrating a whole system of a general network based intelligent service robot. As illustrated in FIG. 1, the general network based intelligent service robot system includes a robot server 20 and a plurality of robot terminals 10: 1, 2, . . . , n interfaced with the robot server 20. Herein, each of the robot terminals 10 is configured with a robot vision processing unit 101 for acquiring and processing an external image, a robot control unit 102 for controlling the robot terminal 10, a robot server communication unit 103 for serving a role of communicating with the robot server 20, and a robot sensor and drive unit 104 for sensing various kinds of external circumstances and driving the robot terminal 10.

In order to drive the robot terminal 10 in the above system, the robot terminal 10 transmits acquired image information to the robot server 20, and the robot server 20 controls the travel of the robot after recognizing/processing images for obstacles to the robot's traveling and moving.

In the network based intelligent service robot system, since complex applications with high capacity and a load requiring high speed operation, which are difficult to be processed in each robot terminal 10, are concentrated on the robot server 20 connected over the network, it is possible to implement the robot terminal with a relative low cost. Accordingly, it is possible to provide users with various and high quality services with low price.

That is, in order to provide the users with various functional services with low price in the network based intelligent service robot, the robot controller 102 of the robot terminal 10 is implemented by using a low power embedded processor having advantages in an aspect of price and power consumption, instead of using a personal computer with high price, considering the robot terminal 10 to become cheap.

In addition, the robot controller 102 of the robot terminal 10 is implemented such that it has relatively low computing power.

Furthermore, in case of processing the complex applications in the robot server 20, although the robot terminal 10 may be implemented at low price relatively, communication traffic with the robot server 20 increases after all to raise the communication expense because lots of applications for executing the service are performed within the robot server 20. On the contrary, if various functions are performed in the robot terminal 10 for reducing the expense of the communication with the robot server 20, the load to be processed in the robot terminal 10 may increase so that the robot controller 102 should be implemented at high price for having high computing power.

Thus, there is a need to make a compromise with the constitution of the robot terminal 10 and the communication traffic with the robot server 20, when configuring the network based intelligent service robot system. In particular, the communication traffic between the robot server 20 and the robot terminal 10, becomes a factor which has a large effect on stability of the system as well as the communication expense because the plurality of the robot terminals 10 are connected to the one robot terminal 20 as illustrated in FIG. 1.

Therefore, in order that the network based intelligent service robot may provide the users with the various functional services with low price, the cost of the robot terminal should be reduced to be low, first. In addition, another consideration is the communication expense which is caused by using the network. That is, according to the prior art, there is a drawback that it should be considered the communication traffic between the robot terminal and the robot server in the network based intelligent service robot, which is a cause for a considerable additional expense due to the network communication.

DISCLOSURE

Technical Problem

It is an object of the present invention to provide an apparatus and a method for vision processing on a network based intelligent service robot in which an image data, which occupies most of communication traffic with a robot server, is processed in a robot terminal itself, while not implementing the robot terminal with high cost, and a system using the same.

It is another object of the present invention to provide an apparatus for vision processing on a network based intelligent service robot in which the apparatus for vision processing is implemented using a stereo camera, and an acquired data through the stereo camera enables the robot to travel and move without helps of other sensors by extracting/processing three-dimensional distance information with regard to external objects using a stereo matching technology as well as for recognizing an external circumstance of the robot, a vision processing method thereof, and a system using the same.

It is a further another object of the present invention to provide an apparatus and a method for vision processing on a network based intelligent service robot capable of reducing a network communication charge between a robot terminal and a robot server by positioning the aforementioned vision processing apparatus in the robot terminal and not transmitting the image data to the robot server, and a system using the same.

Technical Solution

In one aspect of the present invention, there is provided an apparatus for vision processing on a network based intelligent service robot including: a stereo camera unit acquiring images from two cameras of left/right ones incorporated therein; an input image pre-processing unit for calibrating characteristic differences between the two cameras with respect to the left/right images inputted through the stereo camera unit; a stereo matching unit for performing a stereo matching by computing a disparity map through the stereo matching over the left/right images inputted through the input image pre-processing unit; an image post-processing unit for extracting a depth map for the image outputted from the stereo matching unit, and performing a segmentation for segmenting different objects from the extracted depth map; and an image output selection unit for selectively outputting the output image of the respective units.

In another aspect of the present invention, there is provided a method for vision processing on a network based intelligent service robot, the method including: acquiring an input image from two cameras; performing an input image pre-processing to calibrate the left/right image signals acquired from the two cameras to have the same circumstance, using various image processing methods; performing a stereo matching, at a stereo matching unit, by computing a disparity map after finding out points corresponding to each other in the left/right images calibrated in an input image pre-processing unit; extracting a depth map by calculating a depth based on the disparity map computed at the stereo matching unit, and performing an image post-processing for segmenting different objects by the extracted depth map; extracting the horizontal length, the vertical length, and the distance of the segmented object from the robot terminal, and controlling the robot to travel and move by segmenting/recognizing an object to track or an obstacle on the basis of this extraction result.

In a further another aspect of the present invention, there is provided a system using an apparatus for vision processing on a network based intelligent service robot, including: a robot terminal including a vision processing unit of a robot having the apparatus claimed in claim 1 for acquiring an external image, a robot control unit for controlling a whole robot terminal, a robot server communication unit for serving a role of communicating with a robot server, and a robot sensor/drive unit for sensing an external circumstance and driving the robot; and the robot server interfaced with the robot terminal over network, for controlling the robot under predetermined circumstances.

It is to be understood that both the foregoing general description and the following detailed description of the present invention are exemplary and explanatory and are intended to provide further explanation of the invention as claimed.

Advantageous Effects

According to the present invention, the information required for the robot's traveling and moving is processed in the robot terminal itself without transmitting the information to the robot server by configuring the robot terminal with the stereo camera, and a low price dedicated chip and an embedded processor. Therefore, it is possible to reduce the communication expense which may occur in case of transmitting the necessary image information for driving the intelligent service robot, so that the present invention is effective for embodying the network based intelligent service robot capable of providing users with various functional services with low cost.

Furthermore, according to the present invention, since the acquired image can be used for extracting the three-dimensional distance information of the external objects from the stereo camera as well as recognizing the external circumstance by implementing the vision processing apparatus of the intelligent robot using the stereo camera, the present invention is effective for performing the intelligent robot to travel and move only with the stereo camera image processing without other sensors.

BEST MODE

Reference will now be made in detail to the preferred embodiments of the present invention, examples of which are illustrated in the accompanying drawings.

Figure 1:
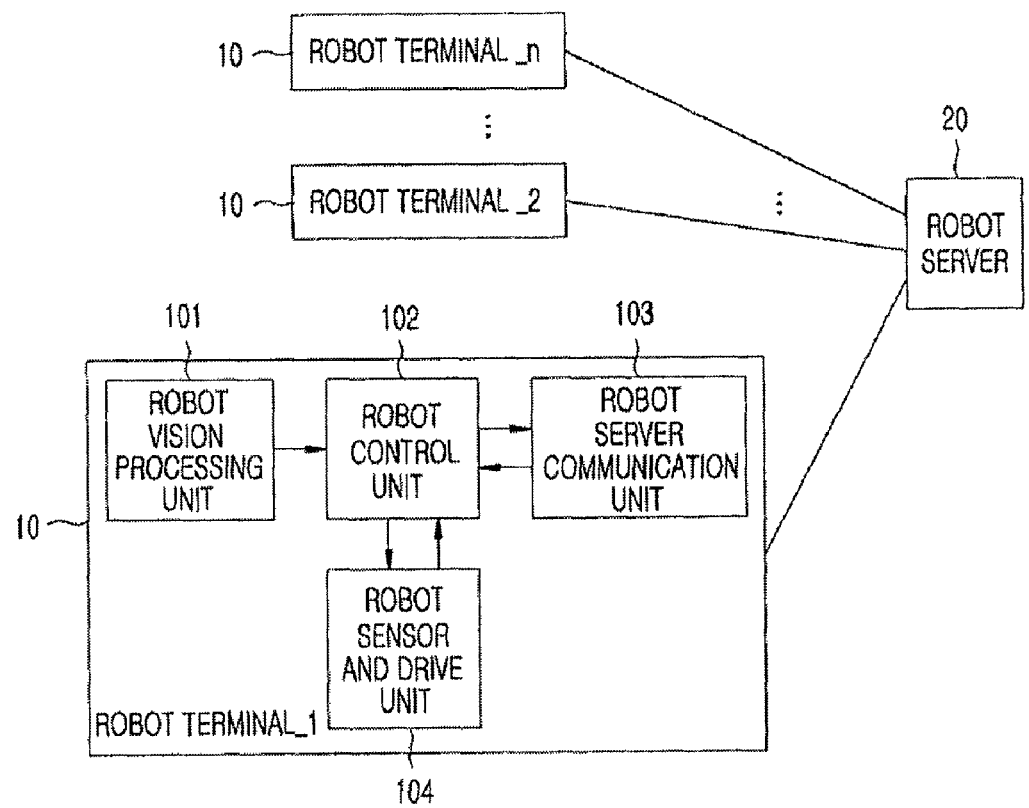
FIG. 1 is a block diagram illustrating a whole system of a general network based intelligent service robot.
Figure 2:
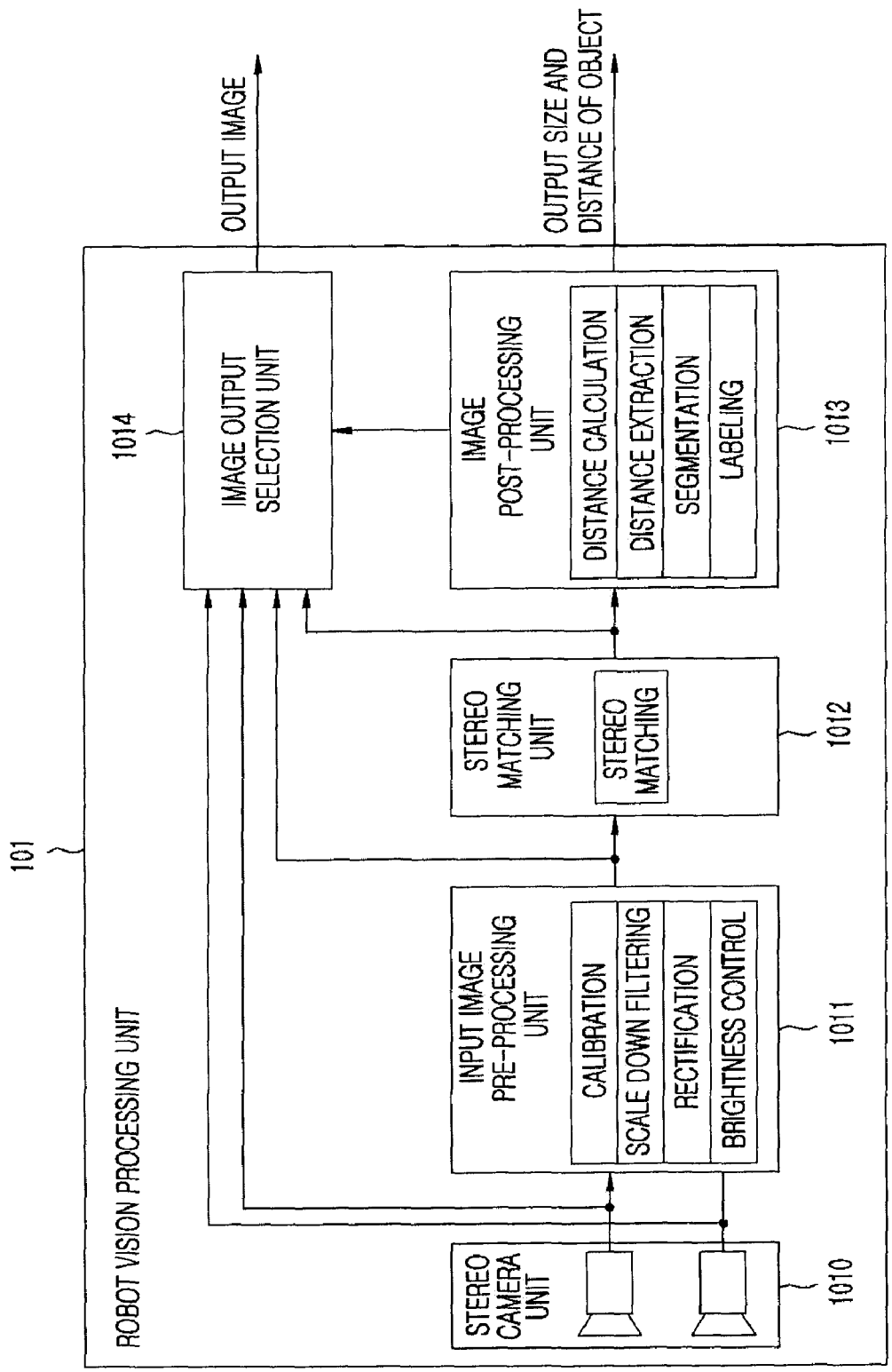
FIG. 2 is a block diagram illustrating an internal constitution of a vision processing unit 101 of a network based intelligent service robot terminal 10 according to an embodiment of the present invention.

FIG. 2 is a block diagram illustrating an internal constitution of a vision processing unit 101 of a network based intelligent service robot terminal 10 according to an embodiment of the present invention.

The vision processing unit 101 of the network based intelligent service robot terminal of the present invention includes a stereo camera unit 1010, an input image pre-processing unit 1011, a stereo matching unit 1012, and an image post-processing unit 1013.

By means of the vision processing unit 101 in the robot terminal, information needed for the travel and movement of the robot is not transmitted to the robot server 20, but can be processed through a robot controller 102 configured with a low price dedicated chip and an embedded processor in the robot terminal itself.

Figure 3:
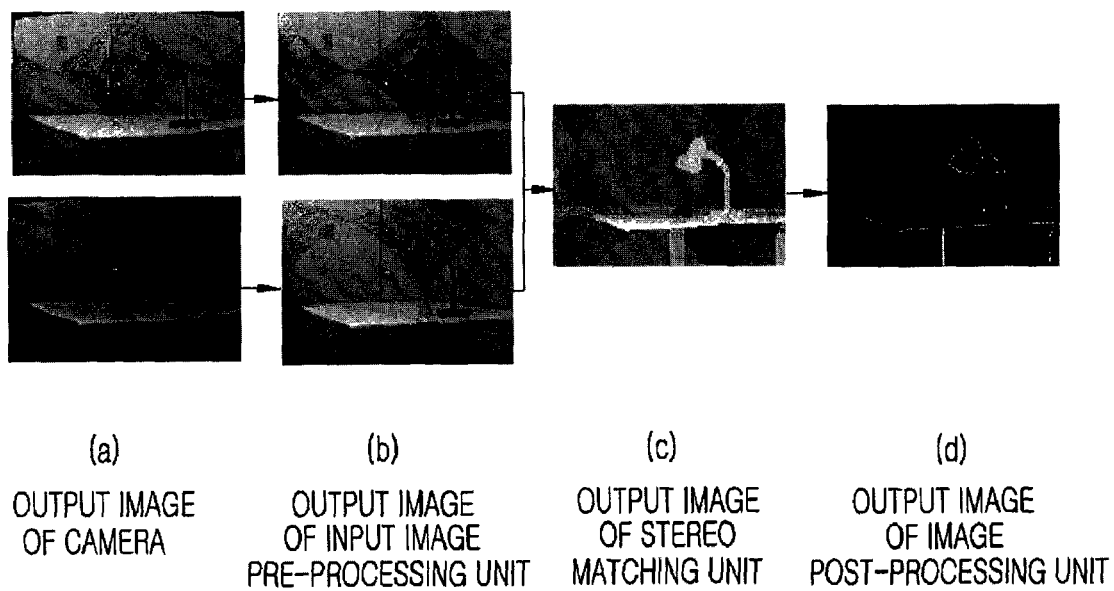
FIG. 3 is a photograph of a resultant image illustrating a vision processing unit of an intelligent service robot according to the present invention.

Considering each element of the vision processing unit 101 in detail, the stereo camera 1010 acquires images from two cameras, i.e., a left one and a right one. Herein, the acquired images are output images of the camera, which are represented in FIG. 3(a).

The input image pre-processing unit 1011 employs various kinds of image processing methods in order that the stereo matching unit 1012 may easily perform stereo matching with respect to the input image of the stereo camera 1010. The various kinds of image processing methods include camera calibration, scale-down of the image, rectification of the image, brightness control of the image, etc. The noise existing in the image is removed using this image processing method. Furthermore, in case that there exits a difference in brightness level or contrast between the image inputted through the two cameras, the image signals inputted from the two cameras are calibrated to be equal to each other by equalizing this image information using such image processing methods. In addition, a histogram equalization, an edge detection or the like is performed over the images outputted from the two cameras so that the images of which the function is wholly improved are outputted after calibration. This outputted image of the input image pre-processing unit 1011 is shown in FIG. 3(b).

The stereo matching unit 1012 finds out points corresponding to each other in the left/right images calibrated at the input image pre-processing unit 1011 and computes a disparity map. In virtue of the stereo matching operation using this disparity map, the output image of the stereo matching unit 1012 is achieved such that the distance information of the object is represented as a bright color for a close object and a dark color for a distant object, respectively, as illustrated in FIG. 3(c).

The image post-processing unit 1013 extracts a depth map by calculating a depth based on the disparity map computed at the stereo matching unit 1012. Then, a segmentation work for different objects is performed from the extracted depth map to obtain the output image of the image post-processing unit 1013, as shown in FIG. 3(d). The image post-processing unit 1013 extracts the horizontal length, the vertical lengths of the segmented objects, and the distances of the segmented objects from the robot terminal, and performs an operation for discriminating whether the objects are objects to track or obstacles on the basis of the extraction results. By using the results of the image post-processing unit 1013, the robot control unit 102 can control the robot to travel and move in the robot terminal itself without being connected to the robot server over network.

An image output selection unit 1014 selects the output image of the vision processing unit 101 of the intelligent service robot. That is, the image output selection unit 1014 may select anyone of the images acquired through the left/right cameras, the resultant image of the input image pre-processing unit 1011, the resultant image of the stereo matching unit 102, and the resultant image of the image post-processing unit 1013.

By implementing the vision processing unit 101 of the network based intelligent robot terminal as illustrated in FIG. 2, it is possible to extract the three-dimensional information of external objects from the image captured at the stereo camera. Thus, there is an advantageous merit that it is possible to perform the intelligent robot to travel and move only with the stereo camera image process without other sensors. In addition, since it is not necessary to transmit the image data, which is a main cause for the communication traffic, to the robot server, the network traffic with the robot server is remarkably reduced. Accordingly, there are advantages that the communication expenses consumed for network communication may be reduced, and further the network based intelligent service robot system in which a plurality of robot terminals are interfaced with one another becomes stable.

Figure 4:
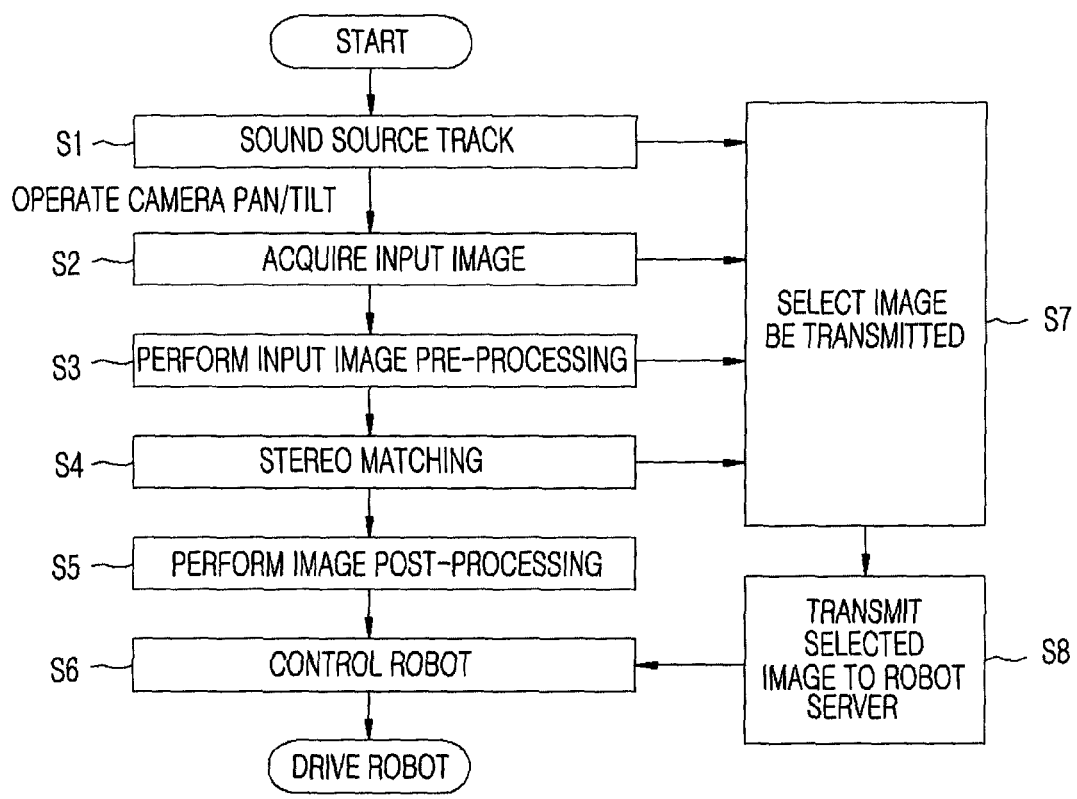
FIG. 4 is a flow chart illustrating a vision processing operation of an intelligent service robot according to the present invention.

A method for vision processing on the network based intelligent service robot according to the present invention will be set forth herebelow with reference to FIG. 4. FIG. 4 is a flow chart illustrating an operation of the vision processing unit 101 of the intelligent service robot terminal.

To begin with, the robot terminal is changed its direction toward the object by operating the camera pan/tilt through a sound source tracking (S1). The input image is acquired through the stereo camera unit 1011 (S2).

An input image pre-processing is performed for adjusting the left/right image signals acquired through the two cameras of the stereo camera unit 1011 to have the same circumstances using various image processing methods (S3).

A stereo matching is performed for obtaining the image that is represented as a bright color and a dark color for a close object and a distant object, respectively by computing the disparity map after finding out points corresponding to each other in the left/right images calibrated at the input image pre-processing unit 1011.

Thereafter, the image post-processing unit 1013 extracts a depth map by calculating a depth based on the disparity map computed at the stereo matching unit 1012. Then, an image post-processing is performed for segmenting different objects from the extracted depth map to obtain the output image of the image post-processing unit (S5).

As a result, the horizontal and vertical lengths, and the distance of the objects segmented during the image post-processing operation (S5) from the robot terminal are extracted, whereby the movement and travel of the robot is controlled by segmenting/recognizing whether the objects are objects to track or obstacles based on the extraction results. If necessary, the robot may be controlled by information provided from the robot server 20. In addition, the image selection unit 1014 selects anyone of the output images of each element of the vision processing unit 101 under certain circumstances (S7), and transmits the selected image to the robot server 20 (S8).

As described above, according to the present invention, the information required for the robot's traveling and moving is processed in the robot terminal itself without transmitting the information to the robot server by configuring the robot terminal with the stereo camera, and a low price dedicated chip and an embedded processor. Therefore, it is possible to reduce the communication expense which may occur in case of transmitting the necessary image information for driving the intelligent service robot, so that the present invention is effective for embodying the network based intelligent service robot capable of providing users with various functional services with low cost.

Furthermore, according to the present invention, since the acquired image can be used for extracting the three-dimensional distance information of the external objects from the stereo camera as well as recognizing the external circumstance by implementing the vision processing apparatus of the intelligent robot using the stereo camera, the present invention is effective for performing the intelligent robot to travel and move only with the stereo camera image processing without other sensors.

It will be apparent to those skilled in the art that various modifications and variations can be made in the present invention. Thus, it is intended that the present invention covers the modifications and variations of this invention provided they come within the scope of the appended claims and their equivalents.

The invention claimed is:

1. An apparatus for vision processing on a network based intelligent service robot comprising:
a stereo camera unit acquiring images from two cameras of left and right cameras incorporated therein;
an input image pre-processing unit for calibrating characteristic differences between the left and right cameras with respect to the left and right images inputted through the stereo camera unit;
a stereo matching unit for performing a stereo matching by computing a disparity map through the stereo matching over the left and right images inputted through the input image pre-processing unit;
an image post-processing unit for extracting a depth map for the image outputted from the stereo matching unit, and performing a segmentation for segmenting different objects from the extracted depth map; and
an image output selection unit for selectively outputting the output image of the respective units.

2. The apparatus of claim 1, wherein the input image pre-processing unit uses camera 20 calibration, scale-down of the image, rectification of the image, brightness control of the image, or the like, in order that the stereo matching unit may perform the stereo matching over the image inputted from the stereo camera unit with ease.

3. The apparatus of claim 1 or 2, wherein the image output selection unit, which selects the output image of the vision processing unit of the intelligent service robot, selects and outputs a predetermined image selected from the group consisting of the image acquired from the left and right camera, the resultant image of the input image pre-processing unit, the resultant image of the stereo matching unit, and the resultant image of the image post-processing unit, according to applications of the intelligent service robot terminal.

4. The apparatus of claim 3, wherein the image post-processing unit segments a target to track and an obstacle on the basis of a three-dimensional image information computed through the stereo matching unit, and uses the horizontal, vertical lengths and the distance of the segmented object as information for the robot's traveling and moving.

5. The apparatus of claim 1, wherein the image outputted from the stereo matching unit is represented such that distance information is represented as a bright color for a close object and as a light color for a distant object.

6. A method for vision processing on a network based intelligent service robot, the method comprising:
    acquiring an input image of at least one of an object to track and an obstacle from two cameras comprising a left camera and a right camera;
    performing an input image pre-processing to calibrate the left and right image signals acquired from the left and right cameras to have the at least one of the object to track and the obstacle, using at least one or more image processing methods;
    performing a stereo matching, at a stereo matching unit, by computing a disparity map after finding out points corresponding to each other in the left and right images calibrated in an input image pre-processing unit;
    extracting a depth map by calculating a depth based on the disparity map computed at the stereo matching unit, and performing an image post-processing for segmenting different objects by the extracted depth map; and
    selectively extracting the horizontal length, the vertical length, and the distance of the segmented object from at least one of the acquired input image, the performed input image pre-processing, the performed stereo matching, and the extracted depth map by calculating the depth based on the disparity map computed at the stereo matching unit and the performed image post-processing for segmenting the different objects by the extracted depth map of a robot terminal, and
    controlling the robot to travel and move by at least one of segmenting and recognizing the object to track and the obstacle based on the selected extraction result.

7. The method of claim 6, wherein the controlling of the robot is performed by the robot terminal information provided by a robot server.

8. A system using an apparatus for vision processing on a network based intelligent service robot, comprising:
    a robot terminal including a vision processing unit of a robot having the apparatus claimed in claim 1 for acquiring an external image, a robot control unit for controlling a whole robot terminal, a robot server communication unit for serving a role of communicating with a robot server, and a robot sensor/drive unit for sensing an external circumstance and driving the robot; and
    the robot server interfaced with the robot terminal over network, for controlling the robot under predetermined circumstances.

* * * * *